Figures 1, 2:
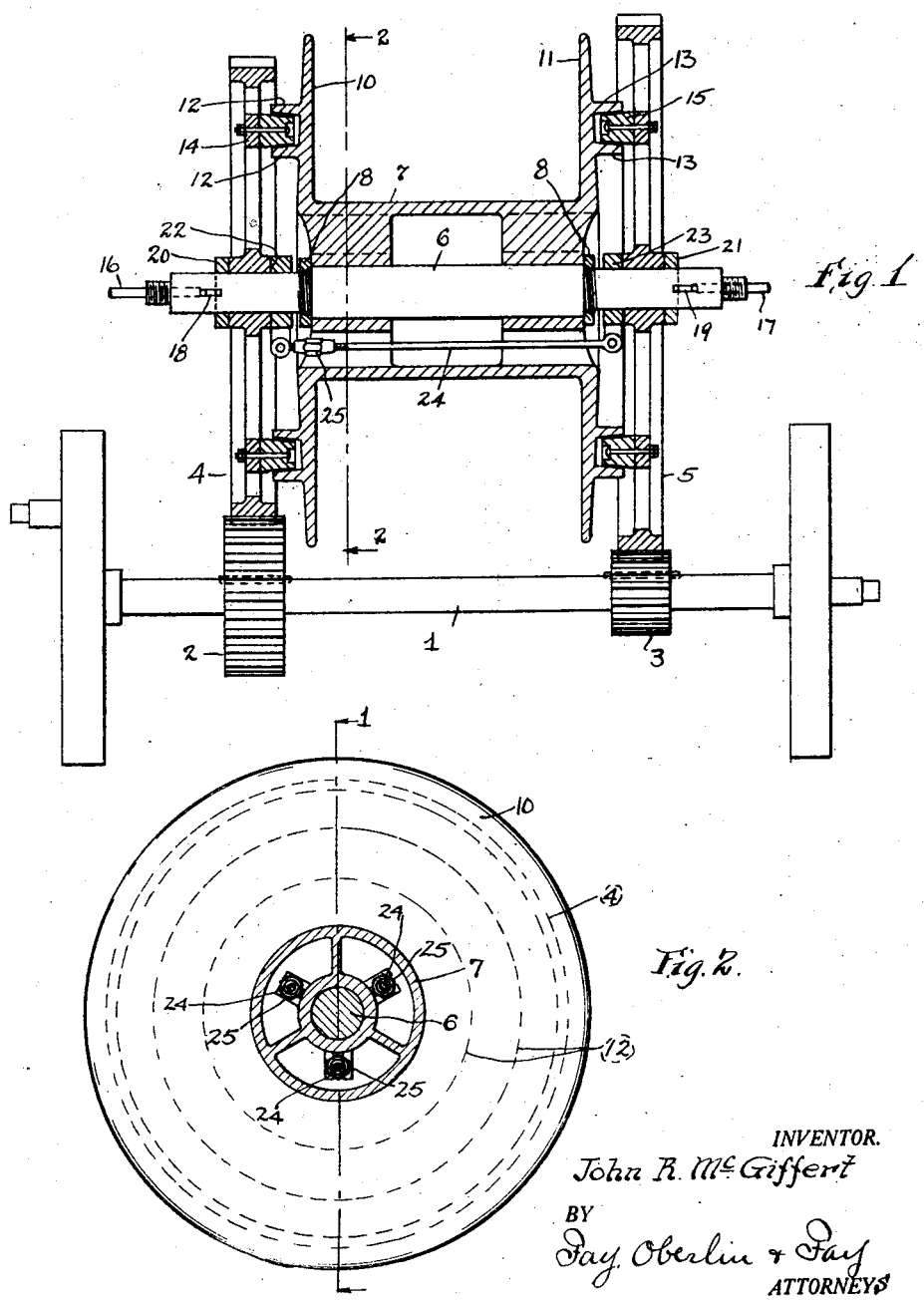

May 10, 1927.

J. R. McGIFFERT

ENGINE

Filed April 24, 1923

1,628,052

INVENTOR.
John R. McGiffert
BY
Fay, Oberlin & Fay
ATTORNEYS

Patented May 10, 1927.

1,628,052

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MAINE.

ENGINE.

Application filed April 24, 1923. Serial No. 634,284.

The present improvements, while relating as indicated to engines, have more particular regard to a power transmission mechanism suitable for use with logging engines and in like situations where a winding drum requires to be operated at different speeds. The object of the invention is the provision of a simple and compact mechanism for the purpose stated and one which will be positive in its action. The mechanism is furthermore so constructed that the drum may be left entirely free of any driving connection with the engine, as may be desirable in unwinding the line.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a central section of my improved power transmission mechanism; and Fig. 2 is a transverse section thereof, the plane of the section being indicated by the line 2—2, Fig. 1.

For the purpose in hand it has been deemed unnecessary to illustrate the engine proper but only the crank shaft 1 thereof which constitutes the drive shaft for the mechanism of present interest. Said crank shaft is provided with two pinions 2 and 3 keyed or otherwise fixedly secured thereto and of different diameters which are complementary to the diameters of two corresponding gears 4 and 5 rotatably mounted on a drum shaft 6 parallel with said crank shaft 1. Said shaft 6 is designed to be stationarily supported in a suitable frame and is formed with a central section of enlarged diameter upon which the drum 7 is rotatably mounted, being at the same time held against endwise movement relatively to said shaft by means of collars 8, threaded or otherwise fixedly secured on the latter adjacent the respective ends of such enlarged portion.

The circular flanges 10 and 11 that form the sides of drum 7 are respectively provided on their outwardly directed faces with pairs of concentric ribs 12, 12 and 13, 13, the inwardly directed faces of such ribs being beveled to co-operate with the correspondingly beveled sides of a friction ring 14 on gear 4 in the one case and with a similar ring 15 on gear 5 in the other case. Such ribs and rings constitute friction driving means so that when either gear 4 or 5, said gears being longitudinally movable on shaft 6 as well as rotatable thereabout, is forced inwardly towards drum 7, it will serve as a driver for said drum. Obviously, depending upon which gear is thus clutched to the drum, the latter will be driven at a rate of speed corresponding with the ratio of such gear and the corresponding pinion on drive shaft 1.

While various means may be employed for moving either gear 4 or 5 inwardly as desired, so as to force the same into driving connection with drum 7 in the fashion just described, I preferably employ thrust pins or bars 16 and 17 that extend centrally inwardly from the respective ends of shaft 6 to cross bars 18 and 19 movable in transverse slots that intersect said shaft at points lying just beyond the outer faces of the hubs of gears 4 and 5, respectively. Interposed between such bars and hubs are collars 20 and 21 which serve to communicate to the corresponding gear any inward thrust movement impressed on either pin 16 or 17. The latter are designed to be operated as usual by means of thrust screws or thrust nuts (not shown) secured to the ends of shaft 6 or to the bearings in which such shaft is supported, such screws or nuts being ordinarily operated by a single lever which is arranged so as to screw in one screw and simultaneously screw out the other, or vice versa. In an intermediate position of the operating lever neither of the thrust pins 16 or 17 is forced inwardly so as to engage the corresponding gear with the drum, but both gears will be out of contact with the latter so that it may turn freely on the shaft.

Contacting with the inner faces of the hubs of gears 4 and 5, respectively, are other collars 22 and 23, which like said gears are both rotatable about and slidable along the corresponding end portions of shaft 6. These two collars 22 and 23 are held a fixed distance apart by means of a plurality of thrust rods 24 (shown as three in number in Fig. 2, only one of such bars, however, appearing in Fig. 1). Such bars extend through holes in drum 7 and are provided with turnbuckles 25 so that their length may be adjusted as the friction faces on the sides of 10 and 11 of the drum and the corresponding friction rings 14 and 15, carried by the respective gears, wear down.

As a result of the foregoing construction, if the means for operating the thrust pins 16 and 17 be moved from neutral position so as to force said pin 16, for example, inwardly, it will be seen that the corresponding gear 4 is engaged with drum 7 and the latter will thereupon be driven from shaft 1 at a rate of speed determined by the ratio of pinion 2 and said gear 4. At the same time that gear 4 is thus forced inwardly into driving engagement with the drum, the other gear 5 will be positively moved outwardly by the action of the thrust bars 24 that connect collars 22 and 23. Not only is disengagement of such other gear thus positively insured when the first mentioned gear is forced into engagement with the drum, but the disengagement of both gears is positively insured when the thrust pins 16 and 17 are brought into neutral position by the means provided for operating said pins.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a drive shaft, a second shaft, pairs of intermeshing gears of different ratios, one member of each such pair of gears being fixed on said drive shaft and the other being rotatably and longitudinally movable on said second shaft, a winding drum rotatably mounted on said second shaft between the two gears thereon, said drum being held against longitudinal movement on said shaft, means for moving either of said gears on said second shaft into engagement with said drum, and a thrust element within the drum for maintaining the said gears in definite spaced relation to each other.

2. In mechanism of the character described, the combination of a drive shaft, a second shaft, pairs of intermeshing gears of different ratios, one member of each such pair of gears being fixed on said drive shaft and the other being rotatably and longitudinally movable on said second shaft, a winding drum rotatably mounted on said second shaft between the two gears thereon, said drum being held against longitudinal movement on said shaft, means for moving either of said gears on said second shaft into engagement with said drum, and a thrust rod alongside said shaft for maintaining the said gears in definite spaced relation to each other.

3. In power transmission mechanism, the combination of a drive shaft, a second shaft parallel therewith, two pairs of intermeshing gears of different ratios, one of each such pair of gears being fixed on said drive shaft and the other being rotatably mounted on said second shaft and also longitudinally movable relatively thereto, a winding drum rotatably mounted on said second shaft between the two gears thereon, said drum being held against longitudinal movement on said shaft and said gears being adapted to non-rotatably engage with said drum upon movement toward the same, means connected with each of the gears on said second shaft adapted to force the same inwardly into engagement with said drum, and plural thrust members interposed between said gears whereby the one thereof is positively disengaged from said drum before the other is brought into engagement therewith, said thrust members lying outside of and parallel with said second shaft.

4. In power transmission mechanism, the combination of a drive shaft, a second shaft parallel therewith, two pairs of intermeshing gears of different ratios, one of each such pair of gears being fixed on said drive shaft and the other being rotatably mounted on said second shaft and also longitudinally movable relatively thereto, a winding drum rotatably mounted on said second shaft between the two gears thereon, said drum being held against longitudinal movement on said shaft and said gears being adapted to non-rotatably engage with said drum upon movement toward the same, means connected with each of the gears on said second shaft adapted to force the same inwardly into engagement with said drum, and plural thrust members of adjustable length interposed between said gears whereby the one thereof is positively disengaged from said drum before the other is brought into engagement therewith, said thrust members lying outside of and parallel with said second shaft.

5. In power transmission mechanism, the combination of a drive shaft, a second shaft parallel therewith, two pairs of intermeshing gears of different ratios, one of each such pair of gears being fixed on said drive shaft and the other being rotatably mounted on said second shaft and also longitudinally movable relatively thereto, a winding drum rotatably mounted on said second shaft between the two gears thereon, said drum being held against longitudinal movement on said shaft and said gears being adapted to non-rotatably engage with said drum upon movement toward the same, means connected with each of the gears on said second shaft adapted to force the same inwardly into engagement with said drum, collars slidably mounted on said second shaft in contact with the inner face of each of the gears thereon, a plurality of thrust bars of adjustable length slidably held in said drums in circumferentially spaced relation and connecting said collars, whereby the one of said gears is positively disengaged from said drum before the other is brought into engagement therewith.

Signed by me, this 19th day of April, 1923.

JOHN R. McGIFFERT.